United States Patent
Green

(10) Patent No.: US 7,101,582 B2
(45) Date of Patent: Sep. 5, 2006

(54) DRIED HONEY ENRICHED WITH VOLATILE HONEY COMPOUNDS

(75) Inventor: Rick Green, Saskatoon (CA)

(73) Assignee: Huny Hunks Ltd., Regina Saskatchewan (CA)

( * ) Notice: Subject to any disclaimer, the term of this patent is extended or adjusted under 35 U.S.C. 154(b) by 169 days.

(21) Appl. No.: 10/181,030

(22) PCT Filed: Jan. 12, 2001

(86) PCT No.: PCT/CA01/00033

§ 371 (c)(1),
(2), (4) Date: Oct. 9, 2002

(87) PCT Pub. No.: WO01/50887

PCT Pub. Date: Jul. 19, 2001

(65) Prior Publication Data

US 2003/0096054 A1 May 22, 2003

(30) Foreign Application Priority Data

Jan. 14, 2000 (CA) .................................... 2296124

(51) Int. Cl.
A23L 1/08 (2006.01)
B01D 3/10 (2006.01)

(52) U.S. Cl. ................. 426/494; 426/658; 426/661; 203/92

(58) Field of Classification Search ............... 426/492, 426/494, 658, 661; 203/92; 127/48
See application file for complete search history.

(56) References Cited

U.S. PATENT DOCUMENTS

| | | | | |
|---|---|---|---|---|
| 3,297,453 A | * | 1/1967 | Berthold | 426/422 |
| 4,346,490 A | * | 8/1982 | Katz et al. | 449/2 |
| 4,536,973 A | * | 8/1985 | Platt et al. | 34/182 |
| 4,885,033 A | * | 12/1989 | Blackburn et al. | 106/494 |
| 5,356,650 A | * | 10/1994 | Kanayama | 426/396 |

FOREIGN PATENT DOCUMENTS

| EP | 0 464 833 A | 1/1992 |
|---|---|---|
| JP | 56023855 | 3/1981 |

OTHER PUBLICATIONS

*Method of Extracting Honey Perfume*, Mar. 27, 1995, Database EPO DOC Online, European Patent Office, Dong Suh Foods Corp., XP–002166392, Abstract.
*Honey Refining Treatment—by Vacuum Melting at Controlled Temp. Followed by Cooling Aromatic Substances Re: Admission*, Apr. 7, 1983, Database WPI, Section Ch, Week 198407, Derwent Publication Ltd.; Apiakta Apiculture, XP–002164927, Abstract.

* cited by examiner

*Primary Examiner*—N. Bhat

(57) ABSTRACT

A process for releasing a volatile honey components form a liquid honey is described wherein water is added to honey, extracting the volatile component and optionally adding the honey component to dried honey. The volatile honey product obtained by the process can be used in food and pharmaceutical products.

The invention relates to a process for treating honey comprising the steps of adding water to the liquid honey; releasing a volatile honey component from the liquid honey by evaporation to product a residual partially dried honey; and collecting the volatile honey component, the volatile honey component may be then added to dried honey solids to improve the flavor and aroma or the volatile honey component can be added to food or medicaments. The prior art, teaches making a dried honey solids adding water to honey and then freeze drying, however in this process the volatile components are lost and the prior art teaches a process for producing solid honey wherein pure honey is subjected to dehydration in a vacuum evaporator, there is no suggestion in the prior art to add water to liquid honey and then distill the honey to release the volatiles from the distillation or evaporator which is collected and then added directly to foods or medicaments or added back to a dried honey.

19 Claims, 2 Drawing Sheets

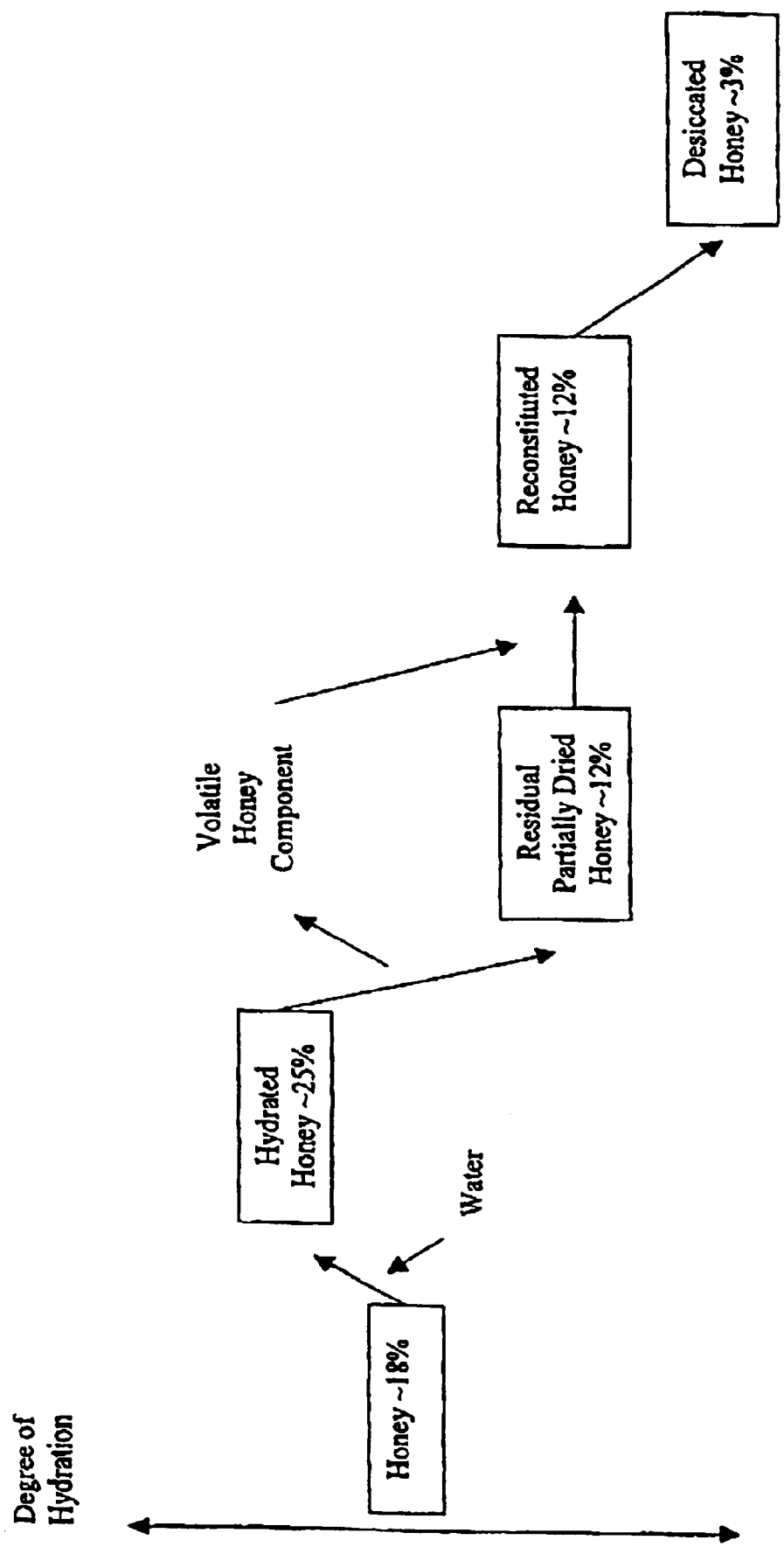

DRIED HONEY ENRICHED WITH VOLATILE HONEY COMPOUNDS

This application is a 371 of PCT/CA01/00033, filed Jan. 12, 2001.

FIELD OF THE INVENTION

The invention is in the field of food products and food processing, and more particularly dried honey products and processing techniques.

BACKGROUND OF THE INVENTION

Preparation of dried honey results in loss of volatile flavours and aroma, which may make the dried product less palatable than liquid honey. There are a number of patents which describe preparation of dried honey products, including solid honey (U.S. Pat. No. 5,356,650), dried honey blended with soy protein, dried milk and sugar (U.S. Pat. No. 3,780,185), dried honey in tablet form (U.S. Pat. No. 3,879,567) and crystallised honey (U.S. Pat. No. 4,885,035, using lyophilization). For example, U.S. Pat. No. 4,529,608 (Szejtli et al., 1985), describes a method for decreasing the loss of aroma in dried honey, by mixing honey with a cyclodextrin before freezing and lyophilization. In an alternative approach, U.S. Pat. No. 4,885,035 (Slifkin, 1986), describes a lyophilization method for drying and crystallizing honey, that is said to reduce the loss of original flavour and fragrance in the dried honey.

SUMMARY OF THE INVENTION

In one aspect, the invention provides processes for treating honey, comprising the steps of releasing a volatile honey component from a liquid honey by evaporation, such as by vacuum evaporation, to produce a residual partially dried honey; and collecting the volatile honey component. The process may comprise a step of adding water to the liquid honey before the step of releasing the volatile honey component from the liquid honey. The process may further comprise the step of adding the volatile honey component to a dried honey to obtain a reconstituted honey, and the dried honey may be prepared from the residual partially dried honey left-over after the release of the volatile honey component. The reconstituted honey may be agglomerated. Alternatively, the volatile honey component may be added to a food product to obtain a treated food product.

BRIEF DESCRIPTION OF THE DRAWINGS

FIG. 2 is a schematic showing one embodiment of the process of the invention, illustrating the changing degree of hydration of the honey products during the process. It will be noted that the reconstituted honey in this embodiment has degree of hydration that is less than the hydration of the original honey, which may facilitate the further drying of the reconstituted honey to produce the desiccated honey without substantial loss of the volatile honey component.

DETAILED DESCRIPTION OF THE INVENTION

Figure 1:
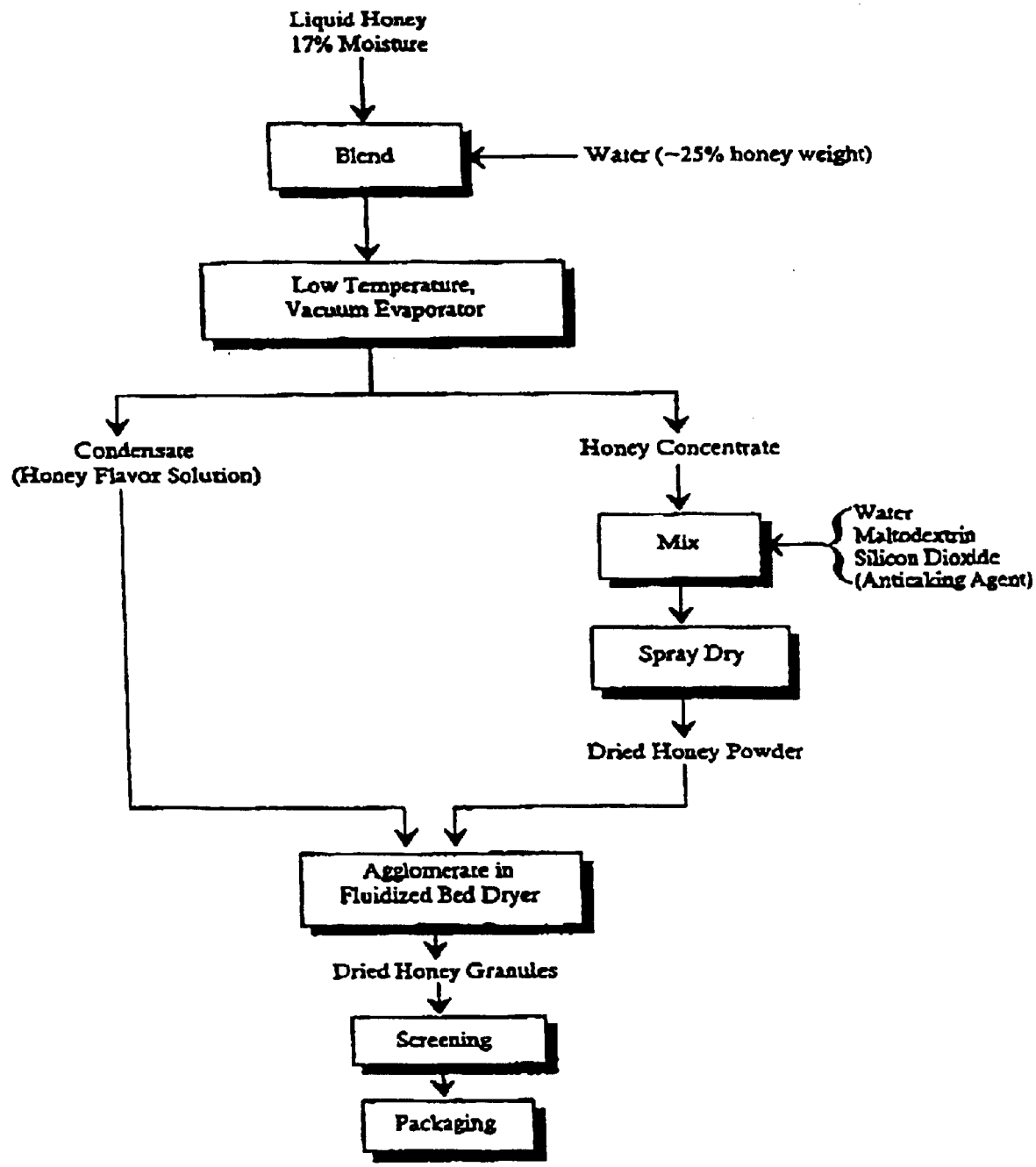
FIG. 1 is a flow diagram of a process of the invention for preparing dried honey granules.

In one aspect, the invention provides methods for extracting components from liquid honey. In a further aspect, the invention provides methods for reincorporating such components into a dried honey product. The invention also provides a dried honey product obtainable from using such processes, and honey components obtained from using such processes.

In one aspect, the invention provides a process for treating honey, comprising the steps of: (a) blending water with a liquid honey; (b) releasing a honey component from said liquid honey by evaporation; and (c) collecting said component.

In another aspect the invention provides a process for treating honey, comprising the steps of: (a) blending water with a liquid honey; (b) releasing a honey component from said liquid honey by evaporation; (c) collecting said component; and (d) adding said component to a dried honey. In another aspect the invention provides an additional step (e) of agglomerating the honey component and the dried honey so that the honey components are incorporated into the resulting dried honey granules.

In some embodiments, commercial liquid honey may be used in the processes of the invention, from which to extract the honey components, and for preparing dried honey. The moisture content of commercial honey typically ranges from about 13% to about 26%. In the processes of the invention, the starting liquid honey product may be standardized to fixed starting moisture content, or alternatively the initial moisture content can be taken into consideration before the addition of water in a blending step. There is also a variation in the flavour and aroma contents of honey. Liquid honey may be chosen for specific types of honey components based on what final aroma and flavours are desired in the end dried honey product. In some embodiments, it may be preferable to use liquid honey with a moisture content ranging from 13% to 26%, alternative ranges are 15% to 20% and 16% to 18%. A higher or lower moisture level may be used, adapting the process if necessary to account for the fact that honey may be degraded by microorganisms which typically grow in honey at moisture levels above 20%.

In some embodiments, liquid honey may be blended with water before releasing selected components from the honey. Blenders, mixers or agitators may for example be used for blending the honey with water. The amount of water to be added may be adjusted depending on the moisture content of the liquid honey. It may be preferred in some embodiments to blend honey with water to obtain a hydrated honey having a moisture content in the range of 20% to 30% by weight, 23% to 27%, or 25% by weight. For example, liquid honey with a moisture content of 18% may be blended with water to about 25% honey by weight. In some embodiments, insufficient hydration may remove too little of the honey flavour while too much hydration may result in the collection of a volatile honey component with only a dilute honey flavour. The optimal amount of water to add may also vary with the type of honey, and the flavour compounds present in the honey, which may vary with the primary crop source (e.g. clover honey, canola honey). In some embodiments, added water may assist in extracting volatile flavour components from the honey matrix, so that the volatile honey flavour components are more volatile and may be evaporated.

Volatile honey components may be extracted from liquid honey and collected by evaporation using techniques such as distillation, flash evaporation, thin film evaporation, short path distillation, and vacuum evaporation. In some embodiments, liquid honey, in diluted or undiluted form, may be placed in a low temperature, vacuum evaporator for evaporation of volatile honey components. The use of low temperature may help to avoid undesired reactions between components of the honey. In some embodiments, evaporation may be carried out under relatively high vacuum and low temperature conditions. For example, evaporation of the volatile honey components may be carried out at 30° C. to 80° C., or at a temperature of 35° C. to 50° C., under a vacuum level of 25 to 28 inches of mercury. To minimize reaction of the volatile components, it may be preferable that the components are collected within a relatively short period of time. In some embodiments this may for example be about 120, 69 or 60 minutes or less. The extent of removal of volatiles may vary, from removal of more than 95% of the volatile component to less than 50%, with alternative embodiments being (by percentage of total volatiles that would be extractable under given conditions, i.e. the available volatiles) more than 99%, more than 95%, more than 90%, 90–99, 50–90, 75–90, or alternative within these ranges. The extent of volatile removal may be measured semi-quantitatively by gas chromatography, measuring the area under peaks present in the volatile honey components, or by counting the peaks to qualitatively assess the extent of volatile component removal. IN alternative embodiments, volatile components may be collected by a flash evaporation where evaporation is relatively rapid. In some embodiments, the volatile components may have vaporiztion temperatures ranging from 35° to 90° C., and in some embodiments the density of the condensate may be between 0.9 and 1.1 g/ml, or about 1 g/ml, although values outside this range are also contemplated.

The evaporated volatile honey components may be condensed and collected leaving a residual honey concentrate. The residual honey concentrate may be dried further, after evaporation of the volatile honey components. Further drying, after vacuum evaporation of the volatile honey components, may for example be carried out by drum/roller, spray drying or microwave vacuum/freeze drying. In some embodiments the honey concentrate may be spray dried at a spray dryer inlet air temperature of 120° C. to 200° C., a spray dryer outlet air temperature of 70 to 120° C., and a feed to the spray dryer of 30 to 35% (w/w) solids content. A wide range of spray drying parameters may be used, depending on the design of the particular dryer. The residual honey concentrate may have added to it various additives such as sweeteners, processing aids, drying aids, bulking agents and anticaking agents. The residual honey concentrate may for example be mixed with water, maltodextrin, and silicon dioxide before being spray dried. Such a process may be used to produce a residual honey concentrate having a moisture content lower than the moisture content of the original honey. The step of evaporating the volatile honey components may for example be carried out on a hydrated honey having a moisture content greater than the moisture content of the original honey (e.g. of about 25%) to produce a residual partially dried honey having a moisture content similar to the original honey (e.g. of about 18%). Powdered maltodextrin and water may then be added before father drying to produce a residual partially dried honey having a moisture content less than the original honey (e.g. of about 12%).

The volatile honey components of the invention may be incorporated into a dried honey. The dried honey may be a residual partially dried honey from which the volatile honey components have been extracted in accordance with the methods of the invention, or dried honey that has been prepared by other processes (such as commercially available honey powders, flakes, granules or crystals). The volatile honey component may be mixed with the dried honey and the resulting mixture agglomerated. For example, the residual partially dried honey powder may be mixed with the volatile honey component condensate and placed on a fluidized bed dryer to agglomerate the mixture. In some embodiments the honey component condensate may be sprayed into the fluidized bed of the dried honey at a fluidized bed air temperature of between about 30° C. to 60° C. The airflow in the dryer may vary with the design of the dryer and quantity of dried honey being agglomerated. One skilled in the operation of the fluidized bed dryer may adjust the airflow to achieve effective fluidization. In some embodiments, the volatile honey component (a flavoured condensate) may be introduced at a rate which maintains a moisture level of 5% to 15% or 8% to 12% (w/w) moisture in the dried honey. As the volatile honey component condensate wets the dried honey particles, they may become sticky and agglomerate when they contact other moist honey particles, to obtain a reconstituted honey. In some embodiments, the reconstituted honey may be further agglomerated, for example using non-flavoured water, once all the honey component condensate has been added, to achieve a larger particle size. Alternatively, water may be used to first agglomerate the residual partially dried honey before the addition of the volatile honey component condensate to complete the agglomeration and to add flavour to the dried honey.

The process of the present invention may be adapted to produce dried honey granules incorporating volatile honey components. For example, after the condensed volatile honey component has been added to the residual partially dried honey, the reconstituted honey may be further dried, for example in a fluidized bed dryer to a moisture level of less than 10%, less than 5% or less than 3%, to produce a desiccated honey. It will be noted that the reconstituted honey may have a moisture content, such as 8–12%, which is less than the moisture content of the original (untreated) honey (typically between 15–20%) and it has been found that the step of drying the reconstituted honey may be adapted so that it does not remove all of the volatile honey component (this may be because the removal of the volatile honey component may depend on an adequate moisture content—as discussed above), so that the volatile honey component remains substantially in the desiccated honey. The desiccated honey may for example have more than 50%, more that 75% or more than 90% of the volatile honey component that was present in the reconstituted honey. In some embodiments, the reconstituted honey of varying moisture content of the present invention may have a honey flavour and aroma that is closer to the original honey than the flavour and aroma of dried honey produced simply by desiccation of the original honey.

In quantitative and qualitative assessments, it has been found that the volatile fraction of untreated honey may have 10 peaks on a gas chromatograph (GC), the volatile honey component of the present invention may have 6 GC peaks and the desiccated honey of the invention may have 4 peaks. Whereas a desiccated honey produced simply by drying a honey may have only 2 peaks. In addition, the 4 peaks of the GC of the desiccated honey of the invention may have a larger area than the 2 peaks of the 'control' desiccated honey produced simply by drying honey. These results indicate that the present invention may be utilized to provide a desiccated honey comprising volatile components (which may add flavour and aroma) that are not present if honey is simply dried.

The reconstituted or desiccated honey of the invention may be screened and packaged in accordance with standard methods. In alternative embodiments, reconstituted honey to which volatile honey components have been added may be added to or coated on other food products. The volatile honey components of the invention may also be added to foods and medicaments to improve palatability.

Although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Numeric ranges are inclusive of the numbers defining the range. In the claims, the word "comprising" is used as an open-ended term, substantially equivalent to the phrase "including, but not limited to".

What is claimed is:

1. A process for treating honey, comprising the steps of:
   (a) adding water to the liquid honey;
   (b) releasing a volatile honey component from the liquid honey by evaporation, to produce a residual partially dried honey;
   (c) collecting the volatile honey component; and
   (d) adding the volatile hone component to a dried honey to obtain a reconstituted honey.

2. The process of claim 1 wherein said water is added to the honey to achieve a moisture content of about 20–30% by weight.

3. The process of claim 1 wherein the step of releasing the volatile honey component from the liquid honey is carried out by an evaporation method selected from the group consisting of vacuum evaporation, distillation, flash evaporation, thin film evaporation, and short path distillation.

4. The process of claim 3 wherein the step of releasing the volatile honey component from the liquid honey is carried out by vacuum evaporation at a temperature of between about 30° C. to 80° C. and a vacuum level of between about 25 to 28 inches of mercury.

5. The process of claim 4 wherein said temperature is between about 35° C. to 50° C.

6. The process of claim 4 wherein said vacuum level is 28 inches of mercury.

7. The process according to claim 4 wherein vacuum evaporation is carried out to remove 50–99% of available volatiles.

8. The process of claims 1 wherein the dried honey is, or is prepared from, the residual partially dried honey.

9. The process of claim 1, wherein the volatile honey component is added to the dried honey in a fluidized bed dryer at an air temperature between about 30° C. to 60° C. at a rate sufficient to maintain a moisture level of about 8 to 12% (w/w) in the dried honey.

10. The process according to claim 1, further comprising the step of agglomerating the reconstituted honey.

11. The process of of claim 1 further comprising the step of adding the volatile honey component to a dried honey that has been agglomerated to a desired particle size, to obtain a reconstituted honey.

12. The process of claim 10 wherein the dried honey is, or is prepared from, the residual partially dried honey.

13. The process of claim 11 further comprising the step of drying the reconstituted honey to obtain a dried honey granules.

14. The process of claim 12 wherein the reconstituted honey is dried to a moisture level of less than about 3 %.

15. A process for preparing dry honey comprising the steps of:
   (a) adding water to a liquid honey to a moisture content of about 25 %;
   (b) extracting a volatile honey component from the liquid honey by vacuum evaporation at a temperature of between about 30° C. to 80 ° C. and a vacuum level of between 25 to 28 inches of mercury for about 60 minutes.
   (c) adding the volatile honey component to a dried honey in a fluidized bed dryer at an air temperature of between about 30° C. to 60° C. at a rate sufficient to maintain a moisture level of about 8 to 12% (ww/) in the dried honey to obtain a reconstituted honey.

16. The process of claim 14 further comprising agglomerating the reconstituted honey.

17. The process of claim 14 further comprising drying the reconstituted honey to a moisture level of less than about 3%.

18. The process of claim 14 further comprising drying the reconstituted honey to a moisture level of less than about 3%.

19. A process for treating a food product, comprising the steps of:
   (a) adding water to a liquid honey, wherein the liquid honey has a first moisture content, to produce a hydrated honey having a second moisture content greater than the first moisture content;
   (b) extracting a volatile honey component from the hydrated honey by evaporation to collect the volatile honey component from the hydrated honey by evaporation to collect the volatile honey component and to leave a residual partially dried honey concentrate that has a third moisture content that is less than the secoind moisture content;
   (c) adding the volatile honey component to the dried honey conentrate to produce a reconstituted honey having a moisture content less than the first moisture content; and,
   (d) drying the reconstituted honey to obtain a desicated honey so that at least one component of the volatile honey component remains substantially in the desiccated honey.

* * * * *